United States Patent
Tsuruhara

(10) Patent No.: US 7,471,785 B2
(45) Date of Patent: Dec. 30, 2008

(54) METHOD AND SYSTEM FOR CONTROLLING OUTSIDE INCOMING CALL TRANSFER IN NETWORK-CONNECTED PRIVATE BRANCH EXCHANGES

(75) Inventor: Koki Tsuruhara, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 877 days.

(21) Appl. No.: 10/831,143

(22) Filed: Apr. 26, 2004

(65) Prior Publication Data

US 2004/0213398 A1 Oct. 28, 2004

(30) Foreign Application Priority Data

Apr. 28, 2003 (JP) ............................. 2003-123283

(51) Int. Cl.
*H04M 7/00* (2006.01)
(52) U.S. Cl. ...................................... 379/225; 379/219
(58) Field of Classification Search ................ 379/219, 379/225

See application file for complete search history.

(56) References Cited

U.S. PATENT DOCUMENTS

| | | | | |
|---|---|---|---|---|
| 4,594,477 A | * | 6/1986 | Noirot | 379/225 |
| 5,422,943 A | * | 6/1995 | Cooney et al. | 379/225 |
| 5,805,690 A | * | 9/1998 | Koepper et al. | 379/225 |
| 6,088,438 A | * | 7/2000 | Yoo | 379/225 |
| 6,404,881 B1 | * | 6/2002 | Murata et al. | 379/225 |
| 6,564,054 B1 | * | 5/2003 | Imafuku et al. | 455/432.1 |
| 6,571,108 B1 | * | 5/2003 | Otsuka et al. | 455/433 |
| 6,625,275 B1 | * | 9/2003 | Miyauchi | 379/266.04 |
| 2001/0043623 A1 | * | 11/2001 | Goto et al. | 370/524 |

FOREIGN PATENT DOCUMENTS

| | | |
|---|---|---|
| JP | 07-307802 | 11/1995 |
| JP | 2000-092215 | 3/2000 |
| JP | 2000-125017 | 4/2000 |
| JP | 2001-197211 | 7/2001 |

* cited by examiner

*Primary Examiner*—Ahmad F. Matar
*Assistant Examiner*—Khai N Nguyen
(74) *Attorney, Agent, or Firm*—Foley & Lardner LLP

(57) ABSTRACT

A system comprising a plurality of network-connected private branch exchanges (PBXs), wherein an outside originating route of a transfer source terminal is applied at call incoming from an originating terminal of the other PBX to a transfer source terminal having a setting of an outside incoming call transfer of a user's own PBX. Upon call incoming from an originating terminal to a transfer source terminal, a PBX accommodating the transfer source terminal transmits a transfer instruction signal including transfer information enabling identifying a PBX accommodating an outside line (a public network) of a transfer destination to a PBX accommodating an originating terminal. The transfer instruction signal is made to pass PBXs other than the PBX accommodating the originating terminal. Upon receiving the transfer instruction signal, the PBX accommodating the originating terminal identifies the PBX accommodating the outside line of the transfer destination by analyzing the transfer information and transmits a transfer originating signal. This causes the PBX accommodating the outside line of the transfer destination to originate an outside call to the transfer destination.

12 Claims, 5 Drawing Sheets

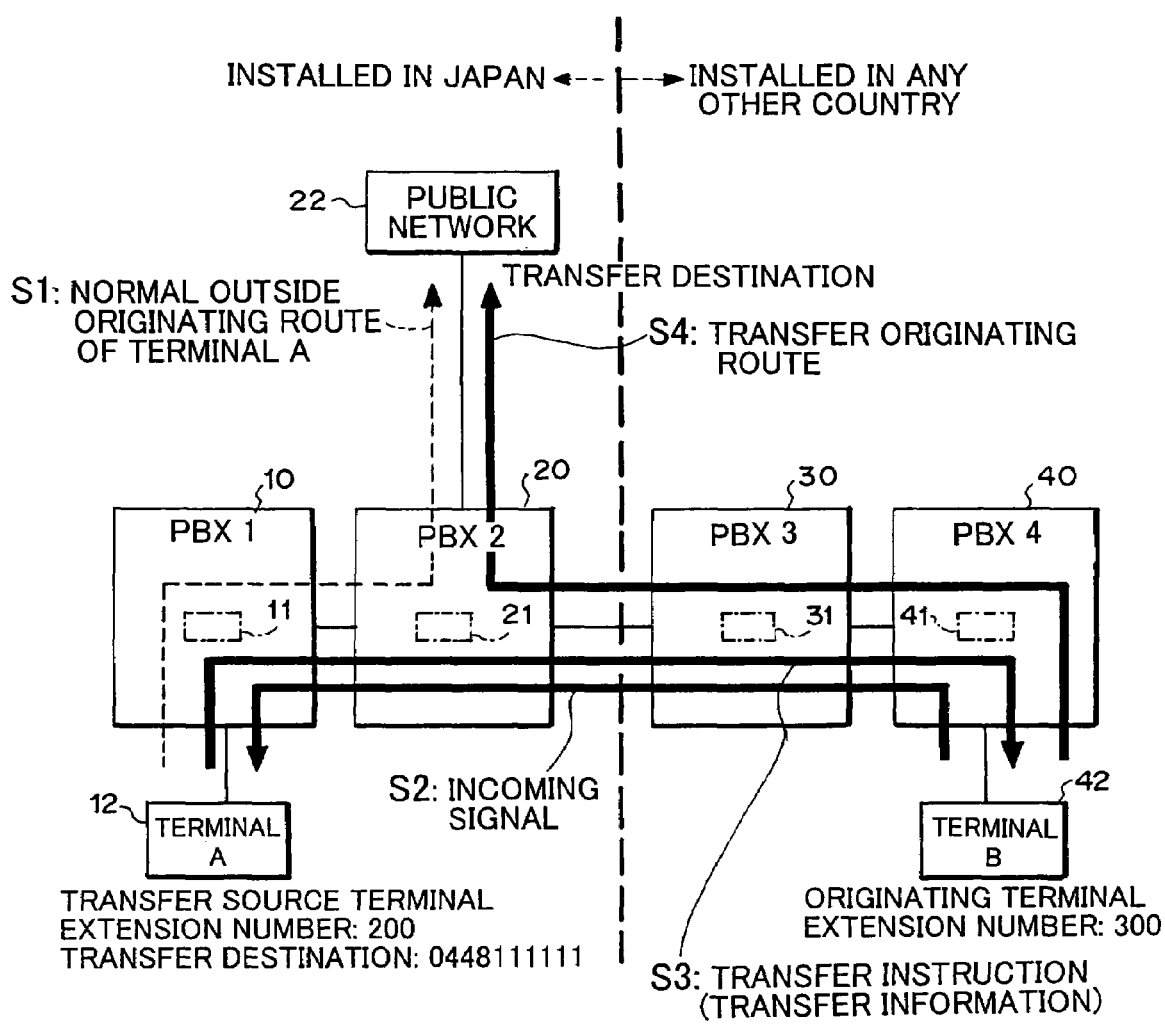

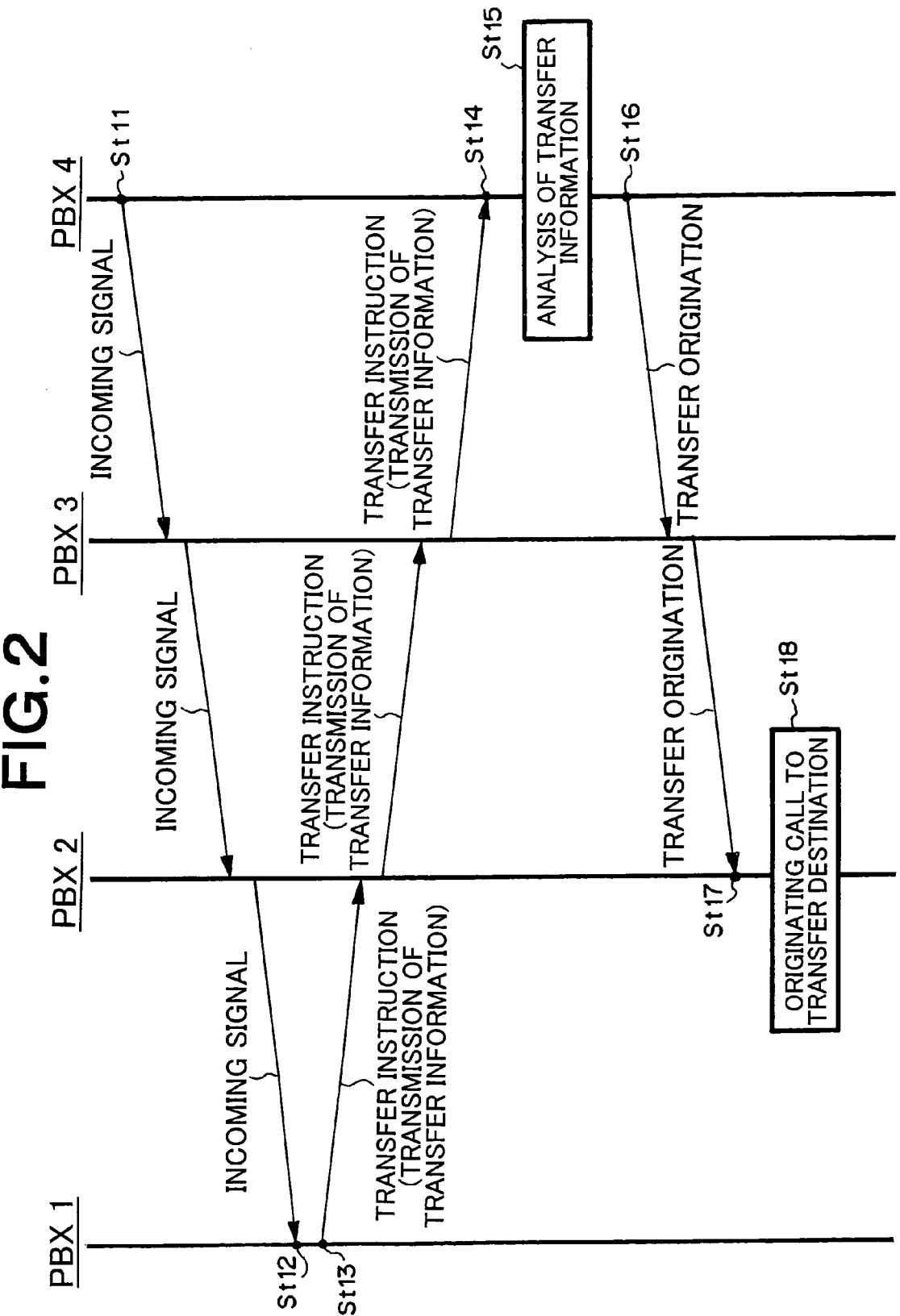

FIG.3

TRANSFER INFORMATION

| | |
|---|---|
| DATA 1 | TRANSFER SOURCE EXTENSION DIAL |
| DATA 2 | NUMBER OF SYSTEMS HAVING PASSED TRANSFER INSTRUCTION. INCREMENTED BY ONE EVERY TIME PBX RECEIVES TRANSFER INSTRUCTION. |
| DATA 3 | NUMBER OF SYSTEMS HAVING PASSED ORIGINATING ROUTE OF TRANSFER SOURCE TERMINAL. NUMBER OF SYSTEMS HAVING PASSED TRANSMISSION ROUTE WHEN TRANSFER INSTRUCTION TRANSMISSION ROUTE DIFFERS FROM OUTSIDE ORIGINATING ROUTE OF TRANSFER SOURCE TERMINAL.UNLESS THESE ROUTES DIFFER FROM EACH OTHER, SET TO 0. |
| DATA 4 | OUTSIDE TELEPHONE NUMBER OF TRANSFER DESTINATION |

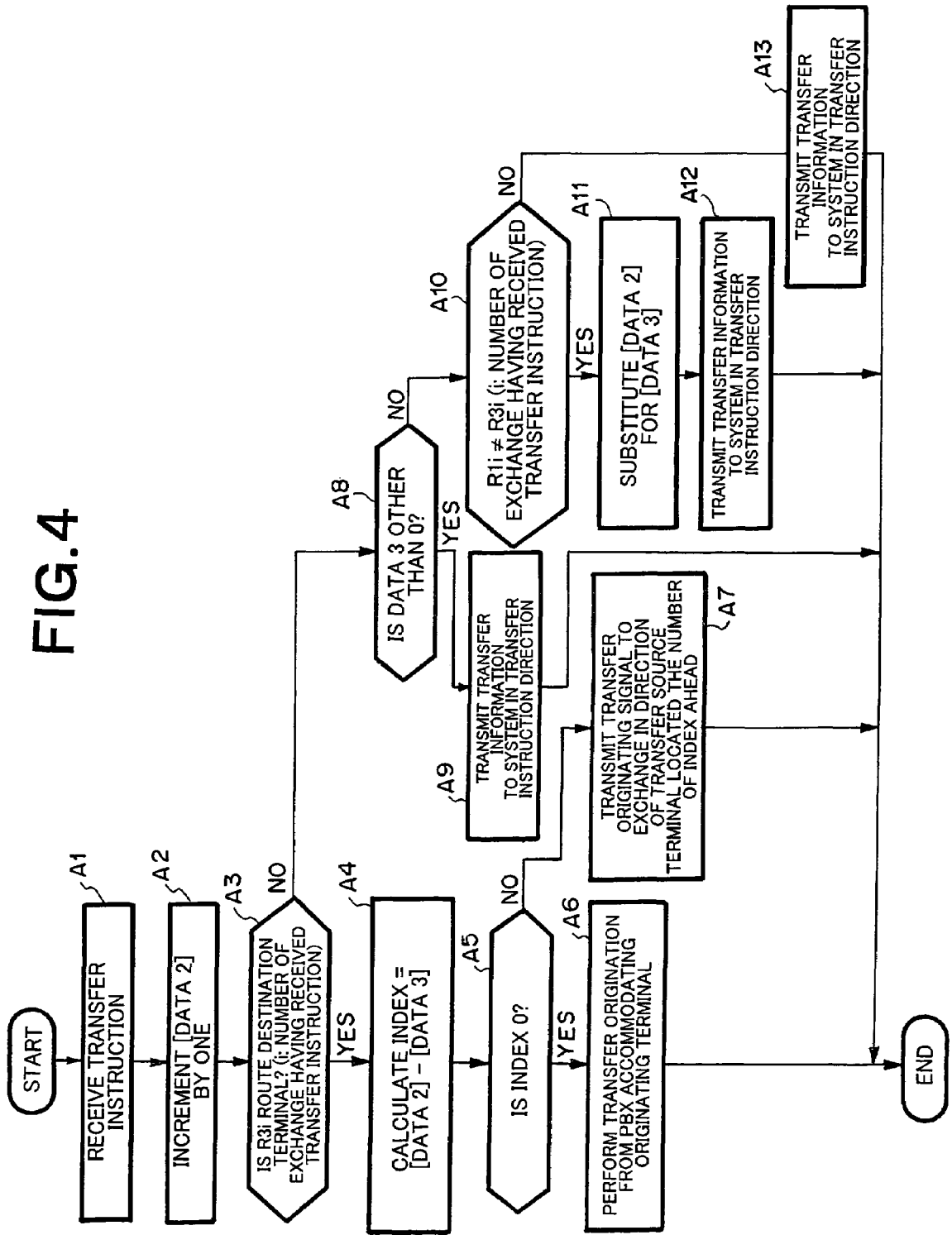

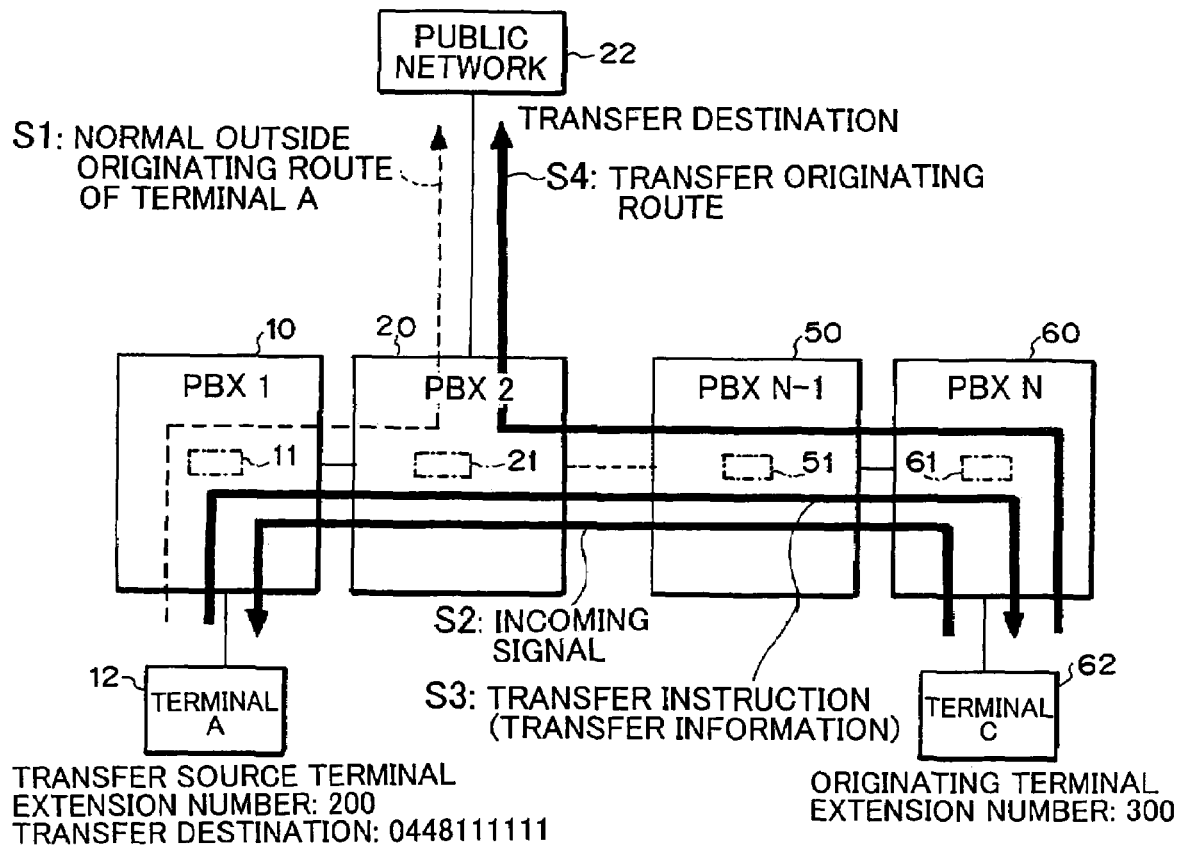

METHOD AND SYSTEM FOR CONTROLLING OUTSIDE INCOMING CALL TRANSFER IN NETWORK-CONNECTED PRIVATE BRANCH EXCHANGES

BACKGROUND OF THE INVENTION

1. Field of the Invention

The present invention relates to a method and a system for controlling an outside incoming call transfer in a plurality of private branch exchanges (PBXs) which are network-connected via a communication network such as an ISDN (Integrated Service Digital Network).

2. Related Background Art

In general, a PBX refers to a system, which is installed on the premises of a company, a factory, a government office, a school, or the like, for controlling exchanges or connections between a plurality of accommodated extension terminals and between the extension terminals and external terminals (general telephone sets), thereby providing extension incoming calls or other services in its own system only on the premises.

In the PBXs accommodating a plurality of extension terminals as stated above, there is a known system having a function of operating a plurality of PBXs (hereinafter, each of the PBXs is simply referred to as a system, if necessary, in some cases) as if they were a single system by networking-connecting the plurality of PBXs (an intersystem communication) so that they can communicate with each other via a network such as the ISDN.

The system comprising the plurality of network-connected PBXs is generally provided with a function of originating a call from the other system accommodating an originating terminal to a transfer destination as an originating outside line for use in a transfer of an outside incoming call to a transfer destination preset in an incoming terminal (a transfer source terminal) when an extension terminal of a user's own system receives a call from an extension terminal (originating terminal) of the other system in the network-connected systems, if an incoming call transfer to an outside line is preset in the incoming terminal.

For example, if a system A is network-connected to a system B and a transfer source terminal having a preset incoming call transfer to an outside line of the system A receives a call from an originating terminal of the system B, the system B automatically originates a call of an outside call number (telephone number) to the transfer destination preset in the transfer source terminal so as to make outside calls via an outside incoming call transfer of the transfer source terminal between the originating terminal of the system B and the transfer destination.

On the other hand, there is, for example, the following conventional known technology regarding a transferred incoming call using an extension terminal accommodated in a PBX.

For example, there have been disclosed a call transfer system, which is capable of transferring an incoming call selectively for each incoming line, for reducing a period of time required for retrieving information on a transfer destination necessary for a call transfer and for improving a phone call handling service and an exchange unit for the call transfer system (for example, refer to JP-A-2000-92215). In this arrangement, an extension terminal previously registers information indicating extension terminals as transfer destinations on a transfer destination table, being associated with an extension number or a line of the terminal, for a PBX; and the PBX detects the extension number of the extension terminal that has requested a display of a transfer destination list, reads the transfer destination list information corresponding to the extension number, and notifies the extension terminal of the transfer destination list information.

Furthermore, there has been disclosed a PBX and a private automatic branch transfer method for decreasing wasteful transfers or inefficient call handling services (for example, refer to JP-A-2000-125017). In this arrangement, a memory unit stores transfer destination telephone numbers grouped by caller numbers on a table for each extension; a modem signal receiving circuit receives a caller number from a station line; a central control unit controls an automatic transfer operation; and the control is executed by selecting a transfer destination number corresponding to a caller number among received and stored caller numbers on the basis of the table data stored in the memory unit. With this arrangement, incoming calls are distributed to optimum transfer destinations according to callers when incoming extension terminals are unattended or the like.

Furthermore, there are a known telephone exchange unit and a known call transfer method for specifying transfer destinations separately according to types of incoming calls so that the calls can be transferred separately (for example, refer to JP-A-2001-197211). It is a telephone exchange unit accommodating a plurality of extension terminals and one or more outside lines and controlling incoming and outgoing call connections between extensions and between an extension and an outside line, comprising: transfer destination registration means for acquiring a transfer destination telephone number for an extension incoming call and that for an outside incoming call and registering the transfer destination telephone numbers being associated with telephone numbers related to a request for registering a transfer destination input from an extension telephone if the registration request is both for the extension incoming call and for the outside incoming call; and call processing means for performing transfer incoming call processing according to whether an incoming call is an extension incoming call or an outside incoming call by referring to the registration content when an extension telephone has received the incoming call.

Furthermore, there has been disclosed a private branch exchange system enabling a call to be transferred to a target transfer destination easily without effort (for example, refer to JP-A-1995-307802). It is an exchange system, which accommodates a plurality of extensions and outside lines, makes exchanges or connections between extensions and outside lines, and has a capability of transferring incoming calls between extensions using a transfer function, comprising: control means having a storing function of storing information of at least a relation between a source and a destination obtained at originating a call from an extension, a control function of obtaining information of an extension related to a source of originating an incoming call on the basis of the information stored by the storing function and controlling its display for an answering extension at transferring the incoming call from the extension answering the incoming call from an extension or an outside line to another extension, and a transfer function of performing a control so that the incoming call can be transferred to an extension corresponding to selection information on the basis of the selection information from the answering extension, wherein the extension is connected to a telephone terminal having means for displaying display information from the control means, operation means for selecting and operating one of the display information, and terminal control means for giving selection information obtained by the operation means to the control means.

In the conventional system comprising the plurality of PBXs network-connected as stated above, however, a call is originated from the other system accommodating an originating terminal to an outside line which is a transfer destination upon receiving an incoming call at a transfer source terminal having a setting of an outside incoming call transfer of a user's own system and thus an outside originating route of the transfer source terminal is not used, thereby causing the following problem.

For example, if a system A is network-connected to a system B, it is assumed that the system A is installed in Japan and the system B is installed in the US. In this condition, if a telephone number for accessing to areas in Japan is previously registered in an outside call transfer destination of an extension terminal accommodated in the system A and if a call is received by a terminal having a setting of an outside call transfer from the system B in the US to the system A in Japan, the call is originated with a telephone number for accessing to areas in Japan from the system B in the US. Therefore, when a telephone number of a transfer destination is sent to a station in the US, it causes incorrect dialing due to a difference in an area of the station problematically.

Regarding this, the conventional technologies of JP-A-2000-92215, JP-A-2000-125017, JP-A-2001-197211, and JP-A-1995-307802 stated above are not particularly intended for the outside incoming call transfer for a networking connection of a plurality of PBXs. Therefore, they cannot resolve the above problem.

SUMMARY OF THE INVENTION

The present invention has been provided in view of the above conventional problem. It is an object of the present invention to provide a method and a system for controlling an outside incoming call transfer in which an outside originating route of a transfer source terminal can be used when a call is received by the transfer source terminal having a setting of an outside incoming call transfer of a user's own PBX from an originating terminal of the other PBX in a system comprising a plurality of network-connected PBXs.

To achieve the above object, there are provided a method and a system for controlling an outside incoming call transfer in network-connected PBXs according to the present invention, in which transfer routing is made so that the same outside line is used as an originating outside line for a normal use and as an originating outside line for a transfer in an originating terminal, with a consideration of an outside originating route of the incoming terminal at an outside incoming call transfer, if a call is received by an extension terminal having a setting of an outside incoming call transfer via the network in an arrangement where systems are network-connected to each other so that a plurality of PBXs were a single system.

The present invention has been completed on the basis of the above conception.

More specifically, according to the present invention, there is provided with an outside incoming call transfer control method for controlling an incoming call transfer from an originating terminal to an outside line of a transfer destination set in a transfer source terminal, when the transfer source terminal receives a call incoming from the originating terminal, wherein the originating terminal is accommodated in a first private branch exchange (PBX), the transfer source terminal is accommodated in a second PBX and having a setting of an incoming call transfer to the outside line of the transfer destination, the outside line of the transfer destination is accommodated in a third PBX, and the first, second, and third PBXs are network-connected via a network, the method comprising the steps of:

(i) when the transfer source terminal receives the call incoming from the originating terminal, transmitting a transfer instruction signal from the second PBX to the third PBX via the network, the transfer instruction signal including transfer information enabling the identifying of the third PBX;

(ii) when the PBX other than the first PBX receives the transfer instruction signal, passing the transfer instruction signal and transmitting it to the other PBX via the network;

(iii) when the first PBX receives the transfer instruction signal, analyzing the transfer information and identifying the third PBX on the basis of the analysis information;

(iv) transmitting a transfer originating signal to the outside line of the transfer destination from the first PBX to the identified third. PBX via the network; and (v) when the third PBX receives the transfer originating signal, originating an outside call to the outside line of the transfer destination on the basis of the transfer originating signal.

Preferably, the transfer information includes first data corresponding to the number of PBXs having passed the transfer instruction signal and second data corresponding to the number of PBXs having passed the transfer instruction signal when a route of the transfer instruction signal in a transmission direction differs from a route of said transfer source terminal in an outside originating direction;

wherein the step (ii) includes the steps of (a) incrementing a numeric value of the first data by one upon receiving the transfer instruction signal, (b) determining whether the route of the transfer instruction signal in the transmission direction differs from the route of the transfer source terminal in the outside originating direction on the basis of predetermined routing information, and (c) setting the numeric value of the first data as a numeric value of the second data if it is determined that the above two routes differ from each other; and wherein the step (iii) includes the steps of (a) incrementing the numeric value of the first data by one upon receiving the transfer instruction signal and (b) identifying, as the third PBX, a PBX located the number of the PBXs equivalent to a calculated difference between both the numeric values of the first data and the second data in the opposite direction of the transfer instruction signal receiving direction.

Furthermore, preferably the routing information may be preset so that the route of the transfer instruction signal in the transmission direction and the route of the transfer source terminal in the outside originating direction can be processed for each plurality of PBXs. In addition, the plurality of PBXs may be connected in series via the network.

According to the present invention, there is provided with An outside incoming call transfer control system for controlling an incoming call transfer from an originating terminal to an outside line of a transfer destination set in a transfer source terminal, when the transfer source terminal receives a call incoming from the originating terminal, wherein the originating terminal is accommodated in a first private branch exchange (PBX), the transfer source terminal is accommodated in a second PBX and having a setting of an incoming call transfer to the outside line of the transfer destination, the outside line of the transfer destination is accommodated in a third PBX, and the first, second, and third PBXs are network-connected via a network, the system comprising:

means for transmitting a transfer instruction signal from the second PBX to the third PBX via the network, when the transfer source terminal receives the call incoming from the originating terminal, the transfer instruction signal including transfer information enabling the identifying of the third PBX;

means for passing the transfer instruction signal and transmitting it to the other PBX via the network, when the PBX other than the first PBX receives the transfer instruction signal;

means for analyzing the transfer information and identifying the third PBX on the basis of the analysis information, when the first PBX receives the transfer instruction signal;

means for transmitting a transfer originating signal to the outside line of the transfer destination from the first PBX to the identified third PBX via the network; and means for originating an outside call to the outside line of the transfer destination on the basis of the transfer originating signal, when the third PBX receives the transfer originating signal.

Preferably, the transfer information includes first data corresponding to the number of PBXs having passed the transfer instruction signal and second data corresponding to the number of PBXs having passed the transfer instruction signal when a route of the transfer instruction signal in a transmission direction differs from a route of said transfer source terminal in an outside originating direction;

wherein the means for passing includes means for incrementing a numeric value of the first data by one upon receiving the transfer instruction signal, means for determining whether the route of the transfer instruction signal in the transmission direction differs from the route of the transfer source terminal in the outside originating direction on the basis of predetermined routing information, and means for setting the numeric value of the first data as a numeric value of the second data if it is determined that the above routes differ from each other; and wherein the means for analyzing includes means for incrementing the numeric value of the first data by one upon receiving the transfer instruction signal and means for identifying, as the third PBX, a PBX located the number of the PBXs equivalent to a calculated difference between both the numeric values of the first data and the second data in the opposite direction to the transfer instruction signal receiving direction.

BRIEF DESCRIPTION OF THE DRAWINGS

In the accompanying drawings:

FIG. 1 is a block diagram showing a configuration of an embodiment of an outside incoming call transfer control system in PBXs according to the present invention;

FIG. 2 is a sequence chart showing a signal flow between a plurality of PBXs and its operation;

FIG. 3 is a diagram illustrating transfer information at a transmission of a transfer instruction;

FIG. 4 is a control flowchart showing an operation procedure for a PBX upon receiving the transfer instruction; and FIG. 5 is a block diagram showing an embodiment in a networking connection of N PBXs.

DETAILED DESCRIPTION OF THE PREFERRED EMBODIMENTS

The preferred embodiments of a method and a system for controlling an incoming call transfer to outside line in network-connected PBXs according to the present invention will now be described in detail hereinafter with reference to FIGS. 1 to 5.

Referring to FIG. 1, there is shown a block diagram of an embodiment of a method and a system for controlling an outside incoming call transfer in a networking connection according to the present invention.

In FIG. 1, a plurality of (four in an example of FIG. 1) PBXs 1 to 4 (hereinafter, referred to as PBXs 10 to 40 of exchange number (No.) 1 to 4) are network-connected to each other via a network (for example, an ISDN line, internet protocol (IP) network (IP-VPN (virtual private network)), etc.) in the outside incoming call transfer control system in networking connection of PBXs according to this embodiment. These PBXs 10 to 40 are connected in series as shown. Among them, the PBXs 10 and 20 of Nos. 1 and 2 are installed in Japan and the PBXs 30 and 40 of Nos. 3 and 4 are installed in any other country.

The PBXs 10 to 40 accommodate a plurality of extension terminals (extension telephones) and outside lines. To make exchanges or connections between the extension terminals or between the extension terminals and the outside lines, they are provided with interfaces (extension circuits) connected to the extension terminals, interfaces (station line circuits, etc.) connected to outside lines (station lines, etc.) such as a public network 22, exchange switches (exchange circuits) for connecting the interfaces for exchanging, communication interfaces (for example, an ISDN interface) (not shown) for networking connections with other PBXs, and control units 11 to 41 for controlling processing executions of their exchanges or connections and various services (for example, an incoming call transfer to an outside line of an extension terminal in this embodiment) for the accommodated extension terminals.

Each of the control units 11 to 41 is formed by, for example, a microcomputer, which includes a CPU controlling the entire apparatus following a preset control program, a RAM forming a work area for executing the CPU program and storing control data, a ROM previously storing a control program and various tables, and a timer clocking a preset time, generating an interrupt signal, and outputting it to the CPU.

The following describes an operation of this embodiment.

An initial setting is described first. In an example shown in FIG. 1, an incoming call transfer to an outside line is preset in an extension terminal A (hereinafter, referred to as a transfer source terminal 12) of an extension number "200" accommodated in the PBX 10 of No. 1 installed in Japan. A telephone number of the transfer destination is "0448111111." "Route S1" corresponding to a normal outside originating route of the transfer source terminal 12 is preset so as to originate a call from the public network 22 connected to an outside line accommodated in the PBX 20 via the PBX 20 of No. 2 from the PBX 10 of No. 1. The following discusses a case where the transfer terminal 12 receives an incoming call from an extension terminal B (hereinafter, referred to as an originating terminal 42) having an extension number "300" accommodated in the PBX 40 of No. 4 installed in any other country via the PBXs 40 to 10 of Nos. 4 to 1 and a transfer instruction from the transfer source terminal 12 is transmitted to the originating terminal 42 via the PBXs 10 to 40 of Nos. 1 to 4 in response to the incoming call.

Referring to FIG. 2, there is shown a sequence chart of the PBXs 10 to 40 (the PBXs 1 to 4 in FIG. 2) in the above condition. The processing of the sequence chart shown in FIG. 2 is executed by a program control with the control units 11 to 41 of the PBXs 10 to 40.

First, an incoming signal S2 is transmitted from the PBX 40 of No. 4 accommodating the originating terminal 41 to the transfer source terminal 12 for an incoming call from the originating terminal 42 to the transfer source terminal 12 (step St11). This incoming signal S2 is transmitted to the PBX 10 of No. 1 accommodating the transfer source terminal 12, passing the PBXs 30 and 20 of Nos. 3 and 2 existing halfway.

Upon receiving the incoming signal S2 (step St12), the PBX 10 transmits a transfer instruction signal including transfer information to the originating terminal 42 following "route S3" of its transmission direction route since an incoming call transfer to the outside line is preset in the transfer source terminal 12 (step St13). The transfer instruction signal is transmitted to the PBX 40 accommodating the originating terminal 42, passing the PBXs 20 and 30 of Nos. 2 and 3 existing halfway.

In this embodiment, regarding the route set between the PBXs 10 and 40, the routing information on "the route S1" corresponding to the normal outside originating route of the terminal A and on "the route S3" corresponding to the transmission direction route of the above transfer instruction signal is defined as follows.

[Route S1]: {R11, R12}
[Route S3]: {R31, R32, R33, R34}
R11: Terminal A (Route source: Transfer source terminal 12) → PBX 20 of No. 2(Route destination)
R12: PBX 20 of No. 2 (Route source) → Outside line (Route destination: Public network 22)
R31: Terminal A (Route destination: Transfer source terminal 12) → PBX 20 of No. 2(Route destination)
R32: PBX 20 of No. 2 (Route destination) → PBX 30 of No. 3 (Route destination)
R33: PBX 30 of No. 3 (Route destination) → PBX 40 of No. 4 (Route destination)
R34: PBX 40 of No. 4 (Route destination) → Terminal B (Route destination: Originating terminal 42) -

The above routing information, namely, "the route S1" corresponding to the normal outside originating route of the terminal A and "the route S3" corresponding to the transmission direction route for the transfer instruction are preset in the memories in the control units 11 to 41 of the PBXs 10 to 40, so that they can be processed in the PBXs 10 to 40 upon receiving the transfer instruction signal.

Referring to FIG. 3, there is shown a diagram illustrating transfer information on the above transfer instruction signal. The transfer information includes data 1 to 4 described below.

Data 1 indicates an extension dial (an extension telephone number) of the transfer source terminal and is set by the PBX accommodating the transfer source terminal. In the above example, the extension number "200" of the transfer source terminal 12 is set by the PBX 10 of No. 1.

Data 2 indicates the number of PBXs that the transfer instruction signal has passed. It is set to an initial value "0" by the PBX accommodating the transfer source terminal and is incremented by one (+1) every time each PBX receives the transfer instruction. In the above example, a value of the data 2 is set to the initial value "0" by the PBX 10 accommodating the transfer source terminal 12 and it is incremented by one (+1) in each of the PBXs 20 to 40 of Nos. 2 to 4 that the signal passes until it reaches the originating terminal 42. Therefore, upon receiving the signal at the PBX 40, the value of the data 2 is +3, namely, "3."

Data 3 indicates the number of passed systems (the number of passed PBXs) of an originating route of the transfer source terminal. When a transfer instruction signal S3 is transmitted, the outside originating route S1 of the transfer source terminal is searched for in each PBX simultaneously with the transmission. If the transmission direction route of the transfer instruction signal and the outside originating route include the same PBXs, the signal S3 is made to pass with the initial value "0." If there are PBXs in one route different from those in the other route, the value of the data 2 at that time is substituted for and set as a value of the data 3 and the signal S3 is made to pass with the value after that. In the above example, "the route S1" corresponding to the outside originating route of the transfer source terminal 12 differs from "the route S3" corresponding to the transmission direction route for the transfer instruction signal in the PBX 20 of No. 2, and therefore the value of the data 2 at that time, namely, "1" is set as a value of the data 3.

Data 4 indicates an outside telephone number of the transfer destination preset in the transfer source terminal and is set by the PBX accommodating the transfer source terminal. In the above example, a transfer destination outside telephone number "0448111111" of the transfer source terminal 12 is set by the PBX 10 of No. 1.

Subsequently, returning to FIG. 2, when the PBX 40 of No. 4 accommodating the originating terminal 42 receives a transfer instruction signal including the above transfer information (step St14), the PBX 40 of No. 4 analyzes a transfer originating route on the basis of the above transfer information data, searches for it, and performs processing for identifying an PBX accommodating an outside line to the transfer destination as a result (step St15).

A control flowchart in FIG. 4 shows an operation of a PBX that has received a transfer instruction signal. The processing of the control flowchart shown in FIG. 4 is performed with an execution of the control program of the control units 11 to 41 in the PBXs 10 to 40 of Nos. 1 to 4 in the example shown in FIG. 1 of this embodiment.

First, upon receiving a transfer instruction signal including transfer information (step A1), the PBX increments a value of the data 2 of transfer information by one (step A2). Then, it determines whether a route destination of "R3i" (i is an exchange number that has received the transfer instruction) is a terminal on the basis of the route S3 defined by the above routing information and a user's own exchange number (step A3).

Unless the route destination of "R3i" is determined to be a terminal in the above step A3 (if NO is selected), it is determined that the route is not for a PBX (system) accommodating the originating terminal and the control progresses to processing of steps A8 to A12. In the above example, the PBXs 10 to 30 of Nos. 1 to 3 fall under this case. It is because the route destinations of R31 to R33 are not terminals.

In this condition, it is first determined whether the value of the data 3 is other than the initial value "0" (step A8): if the value of the data 3 is other than "0" (if YES is selected), a transfer instruction signal is transmitted to the PBX (system) in the direction of the transfer instruction (step A9). In the above example, the PBX 30 of No. 3 falls under this case. It is because the value of the data 2 is substituted for the data 3 when the transfer instruction signal passes the PBX 20 of No. 2 as described later.

On the other hand, unless the value of the data 3 is other than "0" in the above step A8 (if NO is selected), the control progresses to processing of steps A10 to A13. In the above example, the PBXs 10 and 20 of Nos. 1 and 2 fall under this case. In this processing, the PBX determines whether the route "R1i" is not equivalent to "R3i" on the basis of the routes S1 and S3 defined in the routing information and a user's own exchange number (step A10).

If the route "R1i" is determined to be not equivalent to the route "R3i" in the above step A10 (if YES is selected), it is determined that the transmission direction route of the transfer instruction signal differs from the originating route of the transfer source terminal, the value of the data 2 is substituted for the data 3 (step A11), and the transfer information is transmitted to the PBX (system) in the direction of the transfer instruction (step A12). In the above example, the PBX 20 of No. 2 falls under this case. It is because R12 is not equivalent to R32.

On the other hand, if the route "R1i" is determined to be equivalent to the route "R3i" in the above step A10, it is determined that the transmission direction route of the transfer instruction signal does not differ from the originating route of the transfer source terminal, and transfer information is transmitted to the PBX (system) in the direction of the transfer instruction (step A13). In the above example, the PBX 10 of No. 1 falls under this case. It is because R11 is equivalent to R31.

On the other hand, if it is determined that the route destination of "R3i" is a terminal (if YES is selected), it is determined that the route is for the PBX (system) accommodating the originating terminal, and the control progresses to processing of steps A4 to A7. In the above example, the PBX 40 falls under this case.

In the above condition, an index is calculated, first, by subtracting a value of the data 3 from the value of the data 2 (Index=[Data 2]−[Data 3]) (step A4). It is then determined whether the calculated value of the index is "0" (step A5): if the calculated value is "0" (if YES is selected), the PBX accommodating the originating terminal performs transfer originating processing (step A6). Unless the calculated value is "0" (if NO is selected), a transfer originating signal S3 is transmitted to the PBX in the direction of the transfer source terminal located the number of PBXs corresponding to the calculated value of the index ahead (step A7).

For example, in the example shown in FIG. 1, when the transfer instruction signal S3 has reached the originating terminal 42, the transfer information values to be transmitted are "200" for the data 1, "3" for the data 2, "1" for the data 3, and "0448111111" for the data 4. The index value calculated in step A4 in FIG. 4 is "2." Therefore, the PBX accommodating an outside line of the transfer destination can be identified as a PBX located two exchanges ahead of the PBX 40 of No. 4, namely, the PBX 20 of No. 2 on the basis of the value.

Therefore, as shown in FIG. 2, the PBX 40 of No. 4 accommodating the originating terminal 42 transmits a transfer originating signal including a transfer destination outside telephone number to the PBX 20 of No. 2 accommodating the outside line to the transfer destination (step St16). Thereby, upon receiving the transfer originating signal (step St17), the PBX 20 of No. 2 accommodating the transfer outside line originates a call to the transfer destination on the basis of the outside telephone number of the transfer destination (step St18).

Therefore, according to this embodiment, an outside originating route of the transfer source terminal is applied in a networking connection of a plurality of PBXs (intersystem connection), by which it is possible to originate a call on the same outside line as the originating outside line of the transfer source terminal.

For example, the following discusses about a case where a system A is installed in Japan and a system B is installed in the US among a plurality of network-connected PBXs. In this condition, if a telephone number for accessing to areas in Japan is registered in a destination of an outside call transfer of a transfer source terminal accommodated in the system A and an incoming call is received by a terminal having a setting of an outside call transfer from the system B in the US to the system A in Japan, incorrect dialing occurs since the system B in the US originates a call with a telephone number for accessing to areas in Japan conventionally. In this embodiment, however, an outside originating route of the transfer source terminal is applied and therefore it is possible to prevent an occurrence of the incorrect dialing at a transfer of outside incoming call without fail. This also improves the reliability of the system remarkably.

The following describes another embodiment of the present invention by referring to an accompanying drawing.

While the networking connection of four PBXs has been described in the above embodiment, N PBXs are network-connected as shown in FIG. 5 in this embodiment. In an example shown in FIG. 5, a PBX 10 of No. 1, a PBX 20 of No. 2, a PBX 50 of No. N-1, and a PBX 60 of No. N are connected in series.

The following discusses a case where there has been an incoming call at a transfer source terminal 12 accommodated in the PBX 10 of No. 1 similar to the above from an originating terminal 62 accommodated in the PBX 60 of No. N in this embodiment, too. In this condition, regarding the transfer information shown in FIG. 3, the data 2 and the data 3 are represented by N-1 and P, respectively (Data 2=N-1, Data 3=P), where P<N-1. An index calculated in step A4 in FIG. 4 is obtained by the following equation: Index=[Data 2]−[Data 3]=N-1−P. Therefore, if N PBXs are network-connected, an outside line for the transfer destination can be identified on the basis of the index value.

The present invention is not limited to the above embodiments typically illustrated, but those skilled in the art can resort to modifications or changes to various forms within the scope of the claims on the basis of the described contents thereof. These modified or changed forms come within the scope of the claims of the present invention.

For example, while an application to a route connecting a plurality of PBXs in series has been described in the above embodiment, the present invention is not always limited to this, but it is possible to use any connection form of a route connecting a plurality of PBXs such as a branched form into a plurality of routes or a merged form from a plurality of routes.

As set forth hereinabove, according to the present invention, it is possible to provide a method and a system for controlling an outside incoming call transfer in which an outside originating route of a transfer source terminal can be applied at call incoming from an originating terminal of the other PBX to the transfer source terminal having a setting of an outside incoming call transfer of a user's own PBX in a system comprising a plurality of network-connected PBXs.

What is claimed is:

1. An outside incoming call transfer control method for controlling an incoming call transfer from an originating terminal to an outside line of a transfer destination set in a transfer source terminal, when the transfer source terminal receives a call incoming from the originating terminal, wherein the originating terminal is accommodated in a first private branch exchange (PBX), the transfer source terminal is accommodated in a second PBX and having a setting of an incoming call transfer to the outside line of the transfer destination, the outside line of the transfer destination is accommodated in a third PBX, and the first, second, and third PBXs are network-connected via a network, said method comprising the steps of:

(i) when the transfer source terminal receives the call incoming from the originating terminal, transmitting a transfer instruction signal from the second PBX to the third PBX via the network, said transfer instruction signal including transfer information enabling the identifying of the third PBX;
(ii) when the PBX other than the first PBX receives the transfer instruction signal, passing the transfer instruction signal and transmitting it to the other PBX via the network;
(iii) when the first PBX receives the transfer instruction signal, analyzing the transfer information and identifying the third PBX on the basis of the analysis information;
(iv) transmitting a transfer originating signal to the outside line of the transfer destination from the first PBX to the identified third PBX via the network; and
(v) when the third PBX receives the transfer originating signal, originating an outside call to the outside line of the transfer destination on the basis of the transfer originating signal,
wherein the transfer information includes:
first data corresponding to the number of PBXs having passed the transfer instruction signals, and
second data corresponding to the number of PBXs having passed the transfer instruction signal when a route of the transfer instruction signal in a transmission direction differs from a route of said transfer source terminal in an outside originating direction;
wherein said step (ii) includes the steps of:
(a) incrementing a numeric value of the first data by one upon receiving the transfer instruction signal,
(b) determining whether the route of the transfer instruction signal in the transmission direction differs from the route of the transfer source terminal in the outside originating direction on the basis of predetermined routing information, and
(c) setting the numeric value of the first data as a numeric value of the second data if it is determined that the above two routes differ from each other; and
wherein the step of (iii) includes the steps of:
(a) incrementing the numeric value of the first data by one upon receiving the transfer instruction signal, and
(b) identifying, as the third PBX, a PBX located away by the number of the PBXs equivalent to a calculated difference between both the numeric values of the first data and the second data in the opposite direction to the transfer instruction signal receiving direction.

2. The outside incoming call transfer control method according to claim 1, wherein the routing information is preset so that the route of the transfer instruction signal in the transmission direction and the route of said transfer source terminal in the outside originating direction can be processed for each of the plurality of PBXs.

3. The outside incoming call transfer control method according to claim 1, wherein the plurality of PBXs are connected in series via the network.

4. An outside incoming call transfer control system for controlling an incoming call transfer from an originating terminal to an outside line of a transfer destination set in a transfer source terminal, when the transfer source terminal receives a call incoming from the originating terminal,
wherein the originating terminal is accommodated in a first private branch exchange (PBX), the transfer source terminal is accommodated in a second PBX and having a setting of an incoming call transfer to the outside line of the transfer destination, the outside line of the transfer destination is accommodated in a third PBX, and the first, second, and third PBXs are network-connected via a network, said system comprising:

means for transmitting a transfer instruction signal from the second PBX to the third PBX via the network, when the transfer source terminal receives the call incoming from the originating terminal, said transfer instruction signal including transfer information enabling the identifying of the third PBX;
means for passing the transfer instruction signal and transmitting it to the other PBX via the network, when the PBX other than the first PBX receives the transfer instruction signal;
means for analyzing the transfer information and identifying the third PBX on the basis of the analysis information, when the first PBX receives the transfer instruction signal;
means for transmitting a transfer originating signal to the outside line of the transfer destination from the first PBX to the identified third PBX via the network; and
means for originating an outside call to the outside line of the transfer destination on the basis of the transfer originating signal, when the third PBX receives the transfer originating signal,
wherein the transfer information includes:
first data corresponding to the number of PBXs having passed the transfer instruction signal and
second data corresponding to the number of PBXs having passed the transfer instruction signal when a route of the transfer instruction signal in a transmission direction differs from a route of said transfer source terminal in an outside originating direction;
wherein said means for passing includes:
means for incrementing a numeric value of the first data by one upon receiving the transfer instruction signal,
means for determining whether the route of the transfer instruction signal in the transmission direction differs from the route of the transfer source terminal in the outside originating direction on the basis of predetermined routing information, and
means for setting the numeric value of the first data as a numeric value of the second data if it is determined that the above two routes differ from each other; and
wherein said means for analyzing includes:
means for incrementing the numeric value of the first data by one upon receiving the transfer instruction signal and
means for identifying, as the third PBX, a PBX located the number of the PBXs equivalent to a calculated difference between both the numeric values of the first data and the second data in the opposite direction to the transfer instruction signal receiving direction.

5. The outside incoming call transfer control system according to claim 4, wherein the routing information is preset so that the route of the transfer instruction signal in the transmission direction and the route of said transfer source terminal in the outside originating direction can be processed for each of the plurality of PBXs.

6. The outside incoming call transfer control system according to claim 4, wherein the plurality of PBXs are connected in series via the network.

7. The outside incoming call transfer control method according to claim 2, wherein the plurality of PBXs are connected in series via the network.

8. The outside incoming call transfer control system according to claim 5, wherein the plurality of PBXs are connected in series via the network.

9. The outside incoming call transfer control method according to claim 1, wherein the transfer information further includes:

third data that indicates an extension dial of the transfer source terminal; and fourth data that indicates an outside telephone number of the transfer destination preset in the transfer source terminal, wherein, when the determining in step (b) is that the route of the transfer instruction signal in the transmission direction differs from the route of the transfer source terminal in the outside originating direction, the transfer originating signal is transmitted to the PBX in the direction of the transfer source terminal, and when the determining in step (b) is that the route of the transfer instruction signal in the transmission direction does not differ from the route of the transfer source terminal in the outside originating direction, the transfer originating signal is not transmitted to the PBX in the direction of the transfer source terminal.

10. The outside incoming call transfer control system according to claim 4, wherein the transfer information further includes:

third data that indicates an extension dial of the transfer source terminal; and fourth data that indicates an outside telephone number of the transfer destination preset in the transfer source terminal, wherein, when the means for determining determines that the route of the transfer instruction signal in the transmission direction differs from the route of the transfer source terminal in the outside originating direction, the transfer originating signal is transmitted to the PBX in the direction of the transfer source terminal, and when the means for determining determines that the route of the transfer instruction signal in the transmission direction does not differ from the route of the transfer source terminal in the outside originating direction, the transfer originating signal is not transmitted to the PBX in the direction of the transfer source terminal.

11. The incoming call transfer control method according to claim 1, wherein the call incoming from the originating terminal is originated as the outside call on a same outside line as an originating outside line of the transfer source terminal.

12. The incoming call transfer control system according to claim 4, wherein the call incoming from the originating terminal is originated as the outside call on a same outside line as an originating outside line of the transfer source terminal.

* * * * *